United States Patent
Kim et al.

(10) Patent No.: US 6,761,996 B1
(45) Date of Patent: Jul. 13, 2004

(54) DEVICE FOR SEALING LITHIUM SECONDARY BATTERY ELECTROLYTE INJECTING HOLE

(75) Inventors: Soo-Ryoung Kim, Taejeon (KR); Jee-Ho Kim, Taejeon (KR); Jeoung-Soo Kim, Taejeon (KR); Young-Tae Kang, Pyungtaek (KR)

(73) Assignee: LG Chemical Ltd., Seoul (KR)

( * ) Notice: Subject to any disclaimer, the term of this patent is extended or adjusted under 35 U.S.C. 154(b) by 0 days.

(21) Appl. No.: 09/646,664

(22) PCT Filed: Jan. 16, 2000

(86) PCT No.: PCT/KR00/00036
§ 371 (c)(1),
(2), (4) Date: Sep. 20, 2000

(87) PCT Pub. No.: WO00/44056
PCT Pub. Date: Jul. 27, 2000

(30) Foreign Application Priority Data

Jan. 20, 1999 (KR) .......................................... 1999-1633

(51) Int. Cl.[7] .............................................. H01M 2/08
(52) U.S. Cl. ...................................................... 429/185
(58) Field of Search ........................... 429/231.95, 185, 429/171, 180, 183, 184, 53, 56, 82, 89

(56) References Cited

U.S. PATENT DOCUMENTS

| | | | |
|---|---|---|---|
| 3,804,671 A | | 4/1974 | Rosansky |
| 5,173,375 A | * | 12/1992 | Cretzmeyer et al. .......... 429/72 |
| 5,693,430 A | | 12/1997 | Iwatsu et al. ................. 429/72 |
| 6,190,798 B1 | * | 2/2001 | Okada et al. ............... 429/163 |
| 2002/0006542 A1 | * | 1/2002 | Park et al. ..................... 429/72 |

FOREIGN PATENT DOCUMENTS

| | | |
|---|---|---|
| CN | 2046278 | 10/1989 |
| JP | 3216955 | 9/1991 |
| JP | 8007878 | 1/1996 |
| JP | 9007558 | 1/1997 |
| JP | 10241741 | 9/1998 |
| JP | 10261552 | 9/1998 |

* cited by examiner

Primary Examiner—Patrick Ryan
Assistant Examiner—Angela J Martin
(74) Attorney, Agent, or Firm—Baker Botts LLP

(57) ABSTRACT

The invention is a lithium secondary battery that prevents electrolyte and internal gas leakage by durably sealing the electrolyte injecting hole. The lithium secondary battery consists of a battery can, which contains a polar plate set with an anode plate, and a separator inserted and installed inside the battery can. The opening of the battery can has a cap assembly with an electrolyte injecting hole so that the can interior can be sealed. To seal the battery can, a rivet shaped sealing member is inserted in the electrolyte injecting hole. The sealing member is placed in contact with the cap assembly at an area surrounding the electrolyte injecting hole and affixed to the cap assembly.

8 Claims, 4 Drawing Sheets

DEVICE FOR SEALING LITHIUM SECONDARY BATTERY ELECTROLYTE INJECTING HOLE

CROSS REFERENCE TO RELATED APPLICATION

This application is based on application No. 99-1633 filed in the Korean Industrial Property Office on Jan. 20, 1999, the contents of which are incorporated herein by reference.

BACKGROUND OF THE INVENTION (a) Field of the Invention

The present invention relates to a lithium secondary battery, more particularly to a lithium secondary battery wherein an electrolyte-injecting hole is formed at the cap area and is plugged by a sealing member.

(b) Description of the Related Art

As the use of portable electronic devices has been rapidly increasing of late, the consumption of batteries used as power sources for these is also escalating. Secondary batteries that are not discarded after they are discharged but which can be charged and discharged repeatedly are the main battery used for the above application.

A main type of secondary battery currently being researched and developed is a lithium ion secondary battery, which attracts attention from the related industries due to its many advantages, such as large capacity, good stability, and long cycle life.

Although batteries are generally made in a cylindrical shape, as portable electronic devices are gradually miniaturized and being made thinner, prismatic shaped batteries are being developed and manufactured. The production of lithium ion secondary batteries is also following this trend.

FIG. 4 is a sectional perspective view illustrating a general prismatic lithium ion secondary battery in which a polar plate set (3) comprising an anode plate, a cathode plate, and a separator is inserted into a can (1) which plays the role of a cathode terminal. An open part of the above can (1) is sealed by a cap (7) containing an anode terminal (5), and a safety device is installed inside the anode terminal (5).

The polar plate set (3) is first inserted into the can (1), the cap (7) is put on an open part of the can (1), and the joining surface areas thereof are affixed by laser welding in order to manufacture a prismatic battery. Thereafter, an electrolyte is injected into the can (1) through an injecting hole (7a) formed at one side area of the cap (7). As shown in FIG. 5, in the conventional art the above injecting hole (7a) is sealed after the electrolyte has been injected, the sealing method consisting of the insertion of a ball member (9) comprised of aluminum, etc. into the above injecting hole (7a), and a separate thin metallic plate (11) is placed over the ball member (9), completely covering the above injecting hole (7a), and affixed to the above cap (7) by laser welding.

As the area surrounding the injecting hole (7a) is contaminated to a certain degree when electrolyte is injected through the above injecting hole (7a), it is possible for the electrolyte to leak into a gap between the above injecting hole (7a) and the ball member (9), and this leaked electrolyte can affect the thin metallic plate (11). There have been cases where the sealing of the injecting hole (7a) has deteriorated since the welding was poorly made due to leaked electrolyte when the above thin metallic plate (11) is welded to the battery cap (7). Furthermore, the state of the battery can be degraded due to electrolyte leakage and unnecessary internal gas leakage from a poorly sealed injecting hole (7A).

SUMMARY OF THE INVENTION

The present invention is invented taking into account the above problems, and it is an object of the present invention to provide a lithium secondary battery that prevents electrolyte and internal gas leakage by durably sealing the electrolyte injecting hole.

Therefore, the present invention provides a lithium secondary battery comprising as follows:

a) a can having an internal space;

b) a polar plate set comprising an anode plate, a cathode plate, and a separator which is installed by being inserted into the above can;

c) a cap assembly having an electrolyte injecting hole which seals the can interior by being mounted on an open part of the can; and d) a sealing member for an electrolyte injecting hole comprised of an inserting part and a head part which is inserted into the above cap assembly through the above electrolyte injecting hole and affixed to the above cap assembly.

The above sealing member for electrolyte injecting hole which is formed in a rivet-like shape is affixed to the above cap assembly by laser welding.

DETAILED DESCRIPTION OF THE PREFERRED EMBODIMENTS

In the following detailed description, only the preferred embodiments of the invention have been shown and described, simply by way of illustration of the best mode contemplated by the inventor(s) of carrying out the invention. As will be realized, the invention is capable of modification in various obvious respects, all without departing from the invention. Accordingly, the description is to be regarded as illustrative in nature, and not restrictive.

The preferred embodiments are described below in detail based on the appended drawings in order to clarify the present invention.

Figure 1:
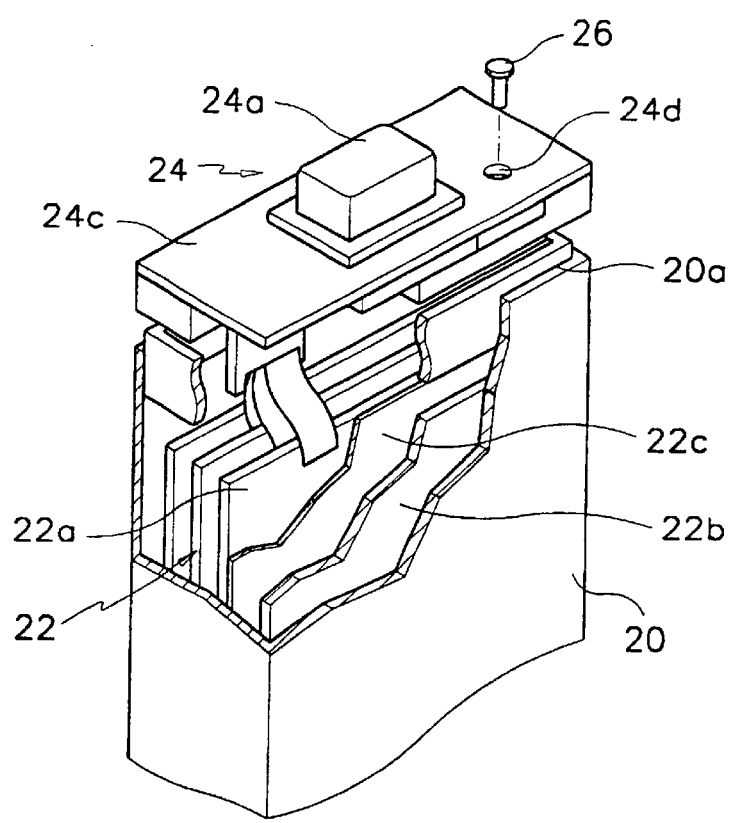
FIG. 1 is a sectional perspective view of a lithium secondary battery according to the embodiments of the present invention.
Figure 2:
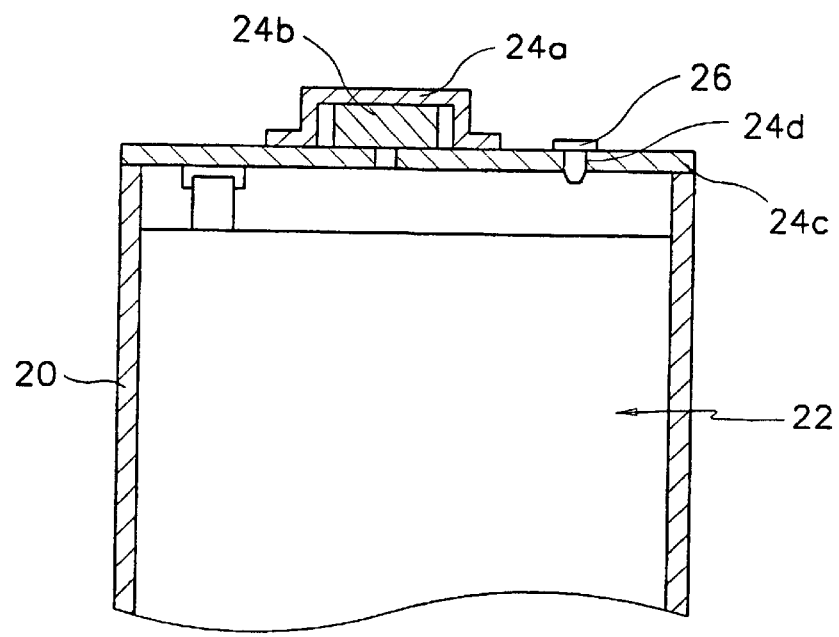
FIG. 2 is a cross-sectional view of a significant part of a lithium secondary battery according to the embodiments of the present invention.

FIG. 1 is a sectional perspective view of a lithium secondary battery according to the embodiments of the present invention, and FIG. 2 is a cross-sectional view of a significant part of a lithium secondary battery according to the embodiments of the present invention.

The aforementioned battery is a prismatic lithium ion secondary battery, and is composed by inserting a polar plate set (22) into an approximately cuboid shaped can (20), injecting electrolyte into it, and mounting a cap assembly (24) comprising an anode terminal (24a) on an open part (20a) thereof.

As in general lithium ion secondary batteries, the polar plate set (22) is composed of an anode plate (22a) on which transition metal oxides or metallic chalcogens are coated, a cathode plate (22b) on which graphite or amorphous carbon is coated, and a separator (22c) which is positioned between the anode and cathode plates (22a, 22b) so as to insulate them, and the above separator (14) retains electrolyte injected into the can (20).

Furthermore, the cap assembly (24), which comprises the anode terminal (24a) as well as a safety device (24b) inside the anode terminal (24a) and has a injecting hole of a certain size at one side of the top cap (24c) for injecting electrolyte, is adhered closely to an open part (20a) of the above can (20) and affixed by laser welding so that the interior of the can (20) is sealed.

During construction of the battery, the anode plate (22a) and cathode plate (22b) are respectively electrically connected to the cap assembly (24) and the can (20).

In the basic structure of the above prismatic lithium ion secondary battery, the cap assembly (24) is united with the can (20), electrolyte is injected into the can (20) through the injecting hole (24d), and the injecting hole (24d) is then sealed. As can be seen in detail in FIG. 3, the sealing member (26) comprises an inserting part (26a) which is inserted and fixed in the injecting hole (24d), and an integral head part (26b) which is closely adhered to the above top cap (24c) once the sealing member (26) has been inserted.

The sealing member (26), which forms a kind of a rivet-like tapered shape, can also be formed in a screw or some other tapered cylindrical shape, and it is preferably made from aluminum, aluminum alloy, stainless steel, etc.

The top cap (24c) area to which the head part (26b) is closely adhered is the area surrounding the injecting hole (24d), and this is the area that can be easily contaminated with electrolyte leaked to the outside of the can (20) through the injecting hole (24d).

Figure 3:
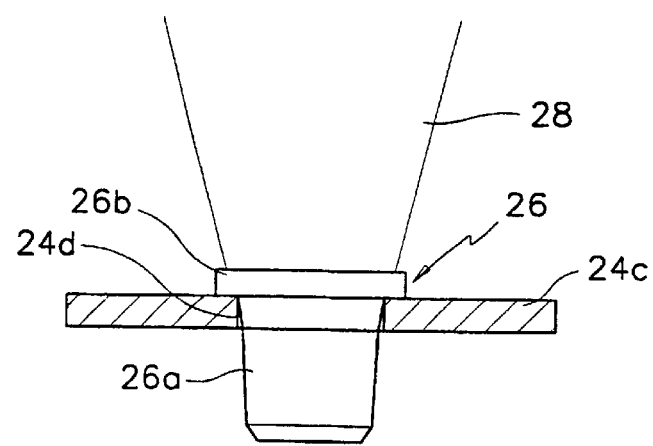
FIG. 3 is a drawing illustrating the sealing member for an electrolyte injecting hole according to the embodiments of the present invention.
Figure 4:
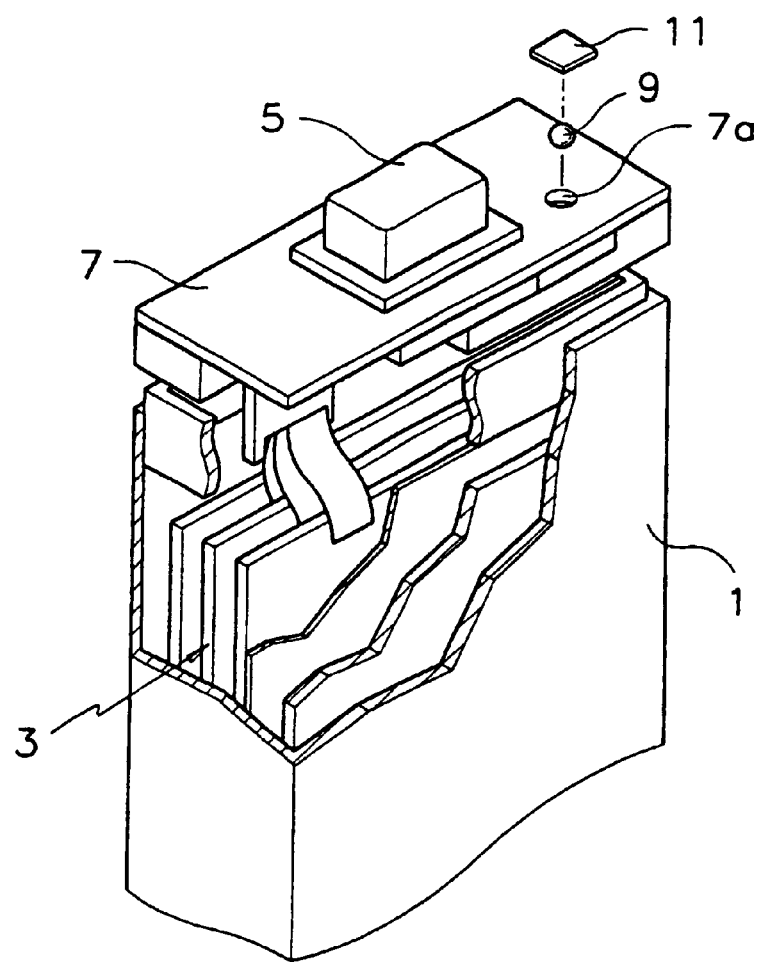
FIG. 4 is a sectional perspective view illustrating a lithium secondary battery according to the prior art technology.
Figure 5:
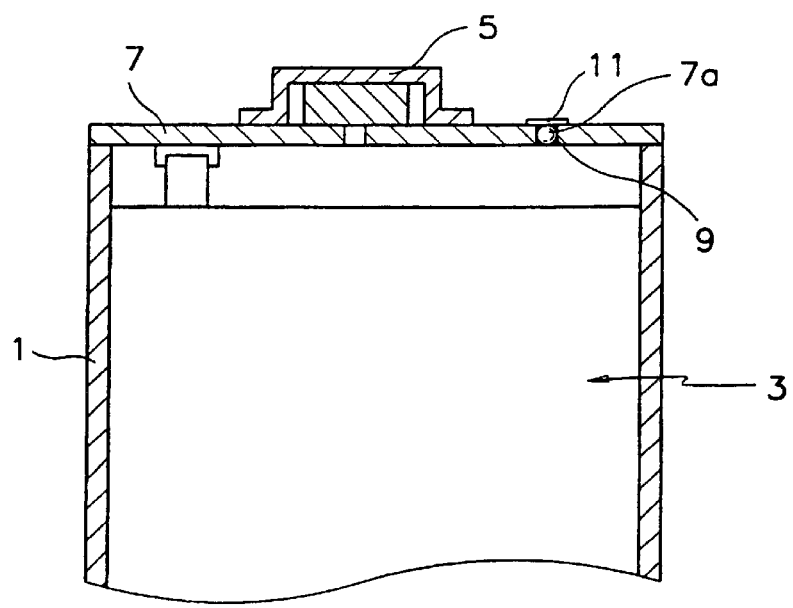
FIG. 5 shows a partial cross-sectional view of a lithium secondary battery according to the prior art technology.

Therefore, the sealing member (26) is united with the injecting hole (24d), welded by an external laser beam (28), and hence affixed to the above top cap (24c) as illustrated in FIG. 3.

That is, the injecting hole (24d) is first plugged by the inserting part (26a) and is finally sealed by welding with a laser beam (28) such that the bottom surface of the head part (26b) is contiguous with the top cap (24c). The sealing of the injecting hole (24d) is therefore a simple process comprising the insertion of the sealing member (26) into the above injecting hole (24d) and irradiating a laser beam on the edge of the above sealing member (26). Electrolyte leakage was compared in cases where the injecting hole (24d) was sealed using the above sealing member (26) as well as when the injecting hole was sealed using the conventional ball member, and the values in the following Table 1 were obtained.

TABLE 1

| Classification | Leak Test | |
|---|---|---|
| No. | Comparative Example 1 | Example 1 |
| 1 | X | X |
| 2 | O | X |
| 3 | X | X |
| 4 | X | X |
| 5 | X | X |
| 6 | O | X |
| 7 | X | X |

TABLE 1-continued

| Classification | Leak Test | |
|---|---|---|
| No. | Comparative Example 1 | Example 1 |
| 8 | O | X |
| 9 | X | X |
| 10 | X | X |
| Leaking ratio (%) | 30% | 0% |

O indicates leak detected, and
X indicates no leaks detected

Comparative Example 1 in Table 1 is an example of the prior art wherein the electrolyte infusing opening was sealed with aluminum balls, and Example 1 is an example of the present invention wherein the electrolyte injecting hole (24d) was sealed by the above rivet shaped sealing member (26).

As can be seen through Table 1, if the area surrounding the electrolyte infusing opening is contaminated with electrolyte, in the prior art the sealing of the opening is degraded because of welding flaws causing electrolyte leakage (Nos. 2, 6, and 8). In the present invention method, the sealing member (26) is welded well, so no electrolyte leakage occurs regardless of the amount of electrolyte contamination over the area surrounding the injecting hole (24d).

Therefore, in the present invention, the electrolyte injecting hole (24d) is sealed by laser welding the sealing member (26) to the top cap (24c) once it is inserted into the injecting hole (24d) of the top cap (24c), so that microscopic cracks are not formed between the sealing member (26) and the surface area of the top cap (24c).

As described in the above embodiments, unnecessary leakage of electrolyte and internal battery gas is prevented by the sealing member of the present invention, which stably seals the electrolyte injecting hole so that the concerned batteries have good safety characteristics, etc.

Furthermore, the present invention has the effect of improving the battery assembly process because the sealing process of the electrolyte injecting hole is carried out simply and certainly using the above sealing member.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A lithium secondary battery comprising:
   a) a can having an internal space;
   b) a polar plate set comprising an anode plate, a cathode plate, and a separator, wherein said polar plate set is installed by being inserted into said can;
   c) a cap assembly having an electrolyte injecting hole arranged on an open part of the can that seals the can's interior; and
   d) a sealing member for the electrolyte injecting hole comprising an inserting part and a head part, wherein the inserting part is inserted into the electrolyte injecting hole and affixed to it, and the head part is closely adhered to the upper surface of the cap assembly when the sealing member is inserted into the electrolyte injecting hole,
   wherein the electrolyte injecting hole is sealed by welding the sealing member such that the bottom surface of the head part is contiguous with the upper surface of the cap assembly.

2. The lithium secondary battery in accordance with claim 1 wherein the sealing member for the electrolyte injecting hole is formed in a rivet shape.

3. The lithium secondary battery in accordance with claim 2 wherein an inserting part of the sealing member for the electrolyte injecting hole is formed in a tapered cylindrical shape.

4. The lithium secondary battery in accordance with claim 2 wherein an inserting part of the sealing member for the electrolyte injecting hole is formed in a cylindrical shape with a tapered point.

5. The lithium secondary battery in accordance with claim 1 wherein the sealing member for the electrolyte injecting hole is formed in a rivet shape which is spirally threaded.

6. The lithium secondary battery in accordance with claim 2 wherein the rivet shape has stages in which an upper portion is put on the cap assembly and a lower portion is inserted into the electrolyte injecting hole.

7. The lithium secondary battery in accordance with claim 1 wherein the sealing member for the electrolyte injecting hole is made of a material selected from the group consisting of aluminum, aluminum alloy, and stainless steel.

8. The lithium secondary battery in accordance with claim 1 wherein the lithium secondary battery is a lithium ion secondary battery.

* * * * *